United States Patent [19]

Chung

[11] Patent Number: 5,028,663
[45] Date of Patent: Jul. 2, 1991

[54] SOLID STATE PROCESSING OF POLYMER BLENDS

[76] Inventor: Chan I. Chung, 2483 Whitehall Ct., Schenectady, N.Y.

[21] Appl. No.: 469,684

[22] Filed: Feb. 22, 1990

Related U.S. Application Data

[62] Division of Ser. No. 188,167, Apr. 28, 1988, abandoned.

[51] Int. Cl.$^5$ .................... C08L 23/06; C08J 3/08; C08J 5/18; C08J 7/08
[52] U.S. Cl. .................... 525/198; 525/197; 525/240; 524/528; 264/322; 264/325
[58] Field of Search .................... 525/197, 198, 240; 524/528; 264/322

[56] References Cited

U.S. PATENT DOCUMENTS

| | | | |
|---|---|---|---|
| 2,983,704 | 5/1961 | Roedel | 525/240 |
| 3,179,719 | 4/1965 | Cines | 525/240 |
| 3,183,283 | 5/1965 | Reding | 524/528 |
| 3,231,636 | 1/1966 | Snyder et al. | 524/528 |
| 3,247,290 | 4/1966 | Werkman et al. | 525/197 |
| 3,914,342 | 10/1975 | Mitchell | 525/240 |
| 3,979,357 | 9/1976 | Salyer et al. | 525/240 |

*Primary Examiner*—Carman J. Seccuro
*Attorney, Agent, or Firm*—Mason, Fenwick & Lawrence

[57] ABSTRACT

This invention involves polyethylene blends prepared by a particular method to achieve a unique solid state processability. More specifically, the polyethylene blends of this invention are high density polyethylenes (HDPE) blended in solution with a minor fraction of branched low density polyethylene, linear low density polyethylene or other polyethylene copolymers with a melting point significantly lower than that of HDPE. The HDPE blends described herein possess a unique large scale deformation characteristics below the melting pointing of the major HDPE component, such that the HDPE blends are suitable for solid state processing such as stamping or forging, etc.

3 Claims, No Drawings

SOLID STATE PROCESSING OF POLYMER BLENDS

This application is a division of application Ser. No. 188,167, filed Apr. 28, 1988, now abandoned.

BACKGROUND AND OBJECTS OF THE INVENTION

The present invention relates in general to polyethylene blends prepared so as to achieve a unique solid state processability, and more specifically to polyethylene blends formed of a major fraction of high density polyethylene (hereinafter referred to as HDPE) blended in solution with a minor fraction of low density polyethylene (referred to as LDPE) such as a branched low density polyethylene, a linear low density polyethylene or a low density polyethylene copolymer.

Enhancement of processability, improvement of product properties and/or reduction of cost for a polymer is often achieved by mixing into the polymer one or more different polymers to form a blend. There are basically two types of blends, compatible blends and incompatible blends. The polymer components in compatible blends are thermodynamically compatible with each other and mix more or less on molecular scale forming a single homogeneous phase. On the other hand, the polymer components in incompatible blends are thermodynamically incompatible and stay as their own separate phases of relatively large macroscopic sizes in the order of 10 microns or more. Polymer blends are usually prepared by mechanically mixing or blending the component polymers using a processing equipment such as extruder or banbury. Alternately, polymer blends may be prepared by dissolving and mixing the component polymers in a solvent. Mechanical mixing is preferred to solution mixing because of the difficulty of handling solvent in solution mixing. The structure, phase sizes and properties of a blend depends on the method and degree of mixing.

Yoshimura et al., U.S. Pat. No. 4,542,886 issued Sept. 24, 1985, discloses that the properties of polyolefine films are improved by mechanically mixing soft polyolefine resin such as low density polyethylene with rigid polyolefine resin such as polypropylene. Stearns et al, U.S. Pat. No. 4,107,243 issued Aug. 15, 1978, discloses a method for preparing thermoplastic fibril by discharging a two-phase mixture of polymer and solvent through a nozzle. The most relevant of these patents to the present invention is Salyer and North U.S. Pat. No. 4,115,499 issued Sept. 19, 1978, disclosing that high density polyethylene (HDPE) pellets mixed with low density polyethylene (LDPE) powders can be used as casting materials. However, the powders and pellets of the Salyer et al. patent are not fused together before usage, and in the casting operation, the HDPE pellets do not undergo any substantial amount of deformation and retain their own very large pellet size. The polyethylene blends are heated to a temperature above the melting point of the LDPE component but below or just above the melting point of the HDPE component in casting, such that the molten LDPE in the blends provides fluidity for processing.

Polymer processing usually involves transformation of a solid polymer into molten state, forcing the polymer melt into a desired shape and then solidifying the polymer melt in its desired shape. Such polymer processing is energy intensive because of the large heat content of polymeric materials and also quite slow because of the low thermal conductivity of polymeric materials. Solid state processing at a temperature below the melting point of polymer such as stamping or forging is desirable since it is energy efficient, fast and economical. This invention discloses polyethylene blends prepared in a particular manner to achieve unique solid state processability.

GENERAL DESCRIPTION OF THE INVENTION

This invention involves polyethylene blends prepared by a particular method such that the blends possess unique solid state processability. More specifically, the polyethylene blends of this invention are prepared by mixing in solution HDPE with a minor fraction of branched low density polyethylene, linear low density polyethylene, or other low density polyethylene copolymer with a melting point substantially lower than that of HDPE. All of the minor component polymers will be referred as LDPE as a class. "High density" polyethylene and "low density" polyethylene are well known in the art. High density polyethylene, as herein used, identifies polyethylene having a density ranging from about 0.935 to 0.960 g/cm$^3$, a melting point of about 135–145 C. Low density polyethylene as herein used, is polyethylene having a density less than about 0.935 g/cm$^3$, and having a melting point not more than 135 C.

The polyethylene blends prepared by solution mixing possess unique large scale deformation characteristics at a temperature above the melting point of the minor LDPE component but below the melting point of the major HDPE component. Therefore, these blends can be processed in solid state at a temperature below the melting point of the major HDPE component. However, the corresponding polyethylene blends prepared by mechanical mixing do not give appreciable deformation below the melting point of the major HDPE component no matter how well they are mixed. The HDPE and LDPE components have a limited compatibility due to their similar chemical compositions, and they become more or less homogeneously mixed when they are dissolved in a solvent because of the solvating effect of the solvent. Upon removal of the solvent, the HDPE and LDPE components segregate into their own phases on a microscopic scale probably in the order of the crystal size of about 0.01 to 0.1 micron. Such microscopic scale mixing can not be achieved by mechanical mixing.

EXAMPLE

A HDPE/LDPE blend with blending ratio of 70/30 by weight was prepared by solution mixing. The HDPE component was a commercial polymer composed of linear polyethylene molecules which can crystallize to a high degree with a melting peak at about 142° C. The LDPE component was also a commercial polymer composed of branched polyethylene molecules which can crystallize only to a low degree with a melting peak at about 117° C. The HDPE component and the LDPE component at the desired blending ratio were dissolved in xylene at 120° C. at a concentration of 1 gram of polymer in 100 ml of solvent. Acetone, a non-solvent to polyethylene, was added to the solution to precipitate out the polymers. The precipitated polymers were filtered and then dried in a vacuum oven at 100° C. for about 45 minutes to obtain a powder sample of 70/30 HDPE/LDPE solution blend. This powder sample was fused at about 160° C. inside a capillary rheometer reservoir to form a solid plug of 0.375 inch diameter. Then, the solid plug with 0.375 inch diameter was extruded at 126° C. through a capillary with 0.050 inch diameter by 1 inch length and 90 degree entrance angle, achieving diameter reduction as much as 7.5 times in solid state. The shear stress at an extrusion rate of 2.4 inverse second was about 300 Kilopascal, and the extrudate showed a very high degree of orientation. The extrudate showed two separate melting peaks corresponding to the component HDPE and LDPE, clearly indicating a two-phase structure. It should be noted that mechanically blended samples of the same HDPE/LDPE composition were prepared using an intermeshing twin-screw extruder and also a banbury-type mixer and these samples could not be extruded at 126° C. using the same rheometer. Also it should be noted that the HDPE/LDPE solution blend had more uniform and greater ductility at room temperature than the corresponding mechanical blend.

The above finding clearly shows that the 70/30 HDPE/LDPE solution blend possess a unique deformation property suitable for solid state processing. A solid blank made of this blend can be shaped at room temperature or heated to only about 126° C. and shaped into desired products undergoing a large scale deformation by stamping, forging or other appropriate processing technique.

I claim:

1. A method of obtaining shaped products from a solid polyethylene polymer blend recovered from a solution blend comprising a) a major fraction of a high density polyethylene having a density of 0.935 to 0.960 g/cm and b) a minor fraction of about 10-40 st. % of a low density polyethylene having a density less than 0.930 g/cm and a melting point significantly lower than that of said high density fraction, the low density polyethylene being a homopolymer or copolymer with a branches or linear structure, in c) a solvent therefor, said recovered blend being fused to form a solid exhibiting a microscopic two-phase structure with two melting points corresponding to those of the component polymers, which comprises subjecting said solid polyethylene blend to solid state processing to shape the same by deformation at a temperature between the melting points of said two polymer fractions.

2. The method of claim 1 wherein said polymer blend is recovered by adding to the solution a non-solvent for said polymers in an amount sufficient to precipitate the same and separated the precipitated polymer blend.

3. The method of claim 1 wherein said high density polyethylene has a melting point of about 135°-145° C. and said low density polyethylene has a melting point lower than 130° C.

* * * * *